(12) United States Patent
Liu et al.

(10) Patent No.: US 8,132,678 B2
(45) Date of Patent: Mar. 13, 2012

(54) POLYBENZOXAZOLE POLYMER-BASED MIXED MATRIX MEMBRANES

(75) Inventors: Chunqing Liu, Schaumburg, IL (US);
Man-Wing Tang, Cerritos, CA (US);
Raisa Serbayeva, Skokie, IL (US);
Lubo Zhou, Inverness, IL (US)

(73) Assignee: UOP LLC, Des Plaines, IL (US)

( * ) Notice: Subject to any disclaimer, the term of this patent is extended or adjusted under 35 U.S.C. 154(b) by 283 days.

(21) Appl. No.: 12/412,647

(22) Filed: Mar. 27, 2009

(65) Prior Publication Data
US 2010/0133187 A1 Jun. 3, 2010

(51) Int. Cl.
*B01D 71/02* (2006.01)
*B01D 71/40* (2006.01)
*B01D 71/64* (2006.01)
*B01D 71/82* (2006.01)
*B01D 59/12* (2006.01)
*B01D 69/00* (2006.01)

(52) U.S. Cl. .............. 210/506; 210/500.41; 210/500.39; 210/500.4; 210/509; 210/502.1; 96/4; 95/43

(58) Field of Classification Search .................. None
See application file for complete search history.

(56) References Cited

U.S. PATENT DOCUMENTS

| | | | |
|---|---|---|---|
| 3,133,132 A | 5/1964 | Loeb et al. | |
| 4,230,463 A | 10/1980 | Henis et al. | |
| 4,717,393 A | 1/1988 | Hayes | |
| 4,855,048 A | 8/1989 | Tang et al. | |
| 4,877,528 A | 10/1989 | Friesen et al. | |
| 5,409,524 A | 4/1995 | Jensvold et al. | |
| 5,679,131 A | 10/1997 | Obushenko | |
| 5,837,032 A | 11/1998 | Moll et al. | |
| 6,368,382 B1 | 4/2002 | Chiou | |
| 6,500,233 B1 | 12/2002 | Miller et al. | |
| 6,626,980 B2 | 9/2003 | Hasse et al. | |
| 6,663,805 B1 | 12/2003 | Ekiner et al. | |
| 6,896,717 B2 | 5/2005 | Pinnau et al. | |
| 6,955,712 B2 | 10/2005 | Yoon | |
| 7,048,846 B2 | 5/2006 | White et al. | |
| 7,052,793 B2 | 5/2006 | Formato et al. | |
| 7,166,146 B2 | 1/2007 | Miller et al. | |
| 7,485,173 B1 | 2/2009 | Liu et al. | |
| 2004/0050250 A1 | 3/2004 | Pinnau et al. | |
| 2005/0268782 A1 | 12/2005 | Kulkarni et al. | |
| 2006/0138042 A1 | 6/2006 | Okamoto et al. | |
| 2007/0022877 A1 | 2/2007 | Marand et al. | |
| 2008/0300336 A1 | 12/2008 | Liu et al. | |
| 2009/0114089 A1* | 5/2009 | Liu et al. ............ | 95/45 |
| 2009/0277327 A1 | 11/2009 | Zhou et al. | |
| 2009/0277837 A1* | 11/2009 | Liu et al. ............ | 210/650 |
| 2009/0297850 A1 | 12/2009 | Jung et al. | |
| 2010/0133171 A1 | 6/2010 | Liu et al. | |
| 2010/0133186 A1 | 6/2010 | Liu et al. | |
| 2010/0133192 A1 | 6/2010 | Liu et al. | |
| 2010/0137124 A1 | 6/2010 | Liu et al. | |
| 2010/0242723 A1 | 9/2010 | Liu et al. | |
| 2010/0243567 A1 | 9/2010 | Liu et al. | |
| 2011/0072973 A1 | 3/2011 | Liu et al. | |
| 2011/0077312 A1 | 3/2011 | Liu et al. | |

FOREIGN PATENT DOCUMENTS

| | | | |
|---|---|---|---|
| GB | 2211193 A | * | 6/1989 |
| JP | 2004231875 A | | 8/2004 |
| KR | 100782959 B1 | | 12/2007 |
| WO | WO 91/16123 | | 10/1991 |

OTHER PUBLICATIONS

U.S. Appl. No. 12/412,629, filed Mar. 27, 2009, Chunqing Liu et al.
U.S. Appl. No. 12/412,633, filed Mar. 27, 2009, Chunqing Liu et al.
U.S. Appl. No. 12/412,639, filed Mar. 27, 2009, Chunqing Liu et al.
U.S. Appl. No. 12/412,643, filed Mar. 27, 2009, Liu et al.
U.S. Appl. No. 12/412,649, filed Mar. 27, 2009, Liu et al.
U.S. Appl. No. 12/412,653, filed Mar. 27, 2009, Liu et al.
Yaghi, Omar M. et al, Metal-organic frameworks: a new class of porous materials, Microporous & Mesoporous. Mater., 73: 3 (2004) pp. 3-14.
Barsema, J.N. et al., "Intermediate polymer to carbon gas separation membranes based on Matrimid PI", J. Membr. Science, 238: 93 (2004) pp. 93-102.
Yaghi, Omar M. et al., Systematic Design of Pore Size and Functionality in Isoreticular MOFs & Their Application in Methane Storage, Science, 295: 469 (2002).
Dybtsev, Danil N. et al., Rigid and Flexible: a Highly Porous Metal0Organic Framework with Unusual Guest-Dependent Dynamic Behavior, Angew. Chem. Int. Ed., 43: 5033 (2004). Tullos, Gordon L. et al., "Thermal Conversion of Hydroxy-Containing Imides to Benzoxazoles: Polymer and Model Compound Study", Macromolecules, 32, 3598 (1999).
Ho Bum Park et al., "Polymers with Cavities Tuned for Fast Selective Transport of Small Molecules and Ions", Science, 318, 254 (2007).
HSIAO, "A new class of aromatic polybenzoxazoles containing ortho-phenylenedioxy groups", European Polymer Journal 40 (2004) 1127-1135.
Kim, "Gas permeation properties of polybenzoxazole membranes derived from the thermal rearrangement of poly (hydroxy amide)", The Membrane Society of Korea, 2007 Fall Conference, pp. 129-132.
U.S. Appl. No. 13/165,939, filed Jun. 22, 2011, Liu et al.

* cited by examiner

*Primary Examiner* — Krishnan S Menon
(74) *Attorney, Agent, or Firm* — Mark Goldberg

(57) ABSTRACT

The present invention discloses new types of polybenzoxazole-based mixed matrix membranes and methods for making and using these membranes. The polybenzoxazole-based mixed matrix membranes are prepared by fabricating a polyimide-based mixed matrix membrane by dispersing molecular sieve particles in a continuous aromatic polyimide matrix with pendent hydroxyl groups ortho to the heterocyclic imide nitrogen; and then converting the polyimide-based mixed matrix membrane to a polybenzoxazole-based mixed matrix membrane by heating between 200° and 600° C. under inert atmosphere or vacuum. The polybenzoxazole-based mixed matrix membranes of the present invention can be fabricated into any convenient geometry such as flat sheet (or spiral wound), tube, hollow fiber, or thin film composite. These polybenzoxazole-based mixed matrix membranes exhibit high thermal stability, significantly higher selectivity than the neat polybenzoxazole polymer membranes, and much higher permeability than traditional mixed matrix membranes.

14 Claims, No Drawings

POLYBENZOXAZOLE POLYMER-BASED MIXED MATRIX MEMBRANES

BACKGROUND OF THE INVENTION

This invention pertains to polybenzoxazole-based mixed matrix membranes and methods for making and using these membranes.

In the past 30-35 years, the state of the art of polymer membrane-based gas separation processes has evolved rapidly. Membrane-based technologies have advantages of both low capital cost and high-energy efficiency compared to conventional separation methods. Membrane gas separation is of special interest to petroleum producers and refiners, chemical companies, and industrial gas suppliers. Several applications have achieved commercial success, including carbon dioxide removal from natural gas and from biogas and enhanced oil recovery, and also in hydrogen removal from nitrogen, methane, and argon in ammonia purge gas streams. For example, UOP's Separex™ cellulose acetate polymeric membrane is currently an international market leader for carbon dioxide removal from natural gas.

The membranes most commonly used in commercial gas separation applications are polymeric and nonporous. Separation is based on a solution-diffusion mechanism. This mechanism involves molecular-scale interactions of the permeating gas with the membrane polymer. The mechanism assumes that in a membrane having two opposing surfaces, each component is sorbed by the membrane at one surface, transported by a gas concentration gradient, and desorbed at the opposing surface. According to this solution-diffusion model, the membrane performance in separating a given pair of gases (e.g., $CO_2/CH_4$, $O_2/N_2$, $H_2/CH_4$) is determined by two parameters: the permeability coefficient (abbreviated hereinafter as $P_A$) and the selectivity ($\alpha_{A/B}$). The $P_A$ is the product of the gas flux and the selective skin layer thickness of the membrane, divided by the pressure difference across the membrane. The $\alpha_{A/B}$ is the ratio of the permeability coefficients of the two gases ($\alpha_{A/B}=P_A/P_B$) where $P_A$ is the permeability of the more permeable gas and $P_B$ is the permeability of the less permeable gas. Gases can have high permeability coefficients because of a high solubility coefficient, a high diffusion coefficient, or because both coefficients are high. In general, the diffusion coefficient decreases while the solubility coefficient increases with an increase in the molecular size of the gas. In high performance polymer membranes, both high permeability and selectivity are desirable because higher permeability decreases the size of the membrane area required to treat a given volume of gas, thereby decreasing capital cost of membrane units, and because higher selectivity results in a higher purity product gas.

Polymers provide a range of properties including low cost, permeability, mechanical stability, and ease of processability that are important for gas separation. A polymer material with a high glass-transition temperature ($T_g$), high melting point, and high crystallinity is preferred. Glassy polymers (i.e., polymers at temperatures below their $T_g$) have stiffer polymer backbones and therefore let smaller molecules such as hydrogen and helium pass through more quickly, while larger molecules such as hydrocarbons pass through more slowly as compared to polymers with less stiff backbones. However, polymers which are more permeable are generally less selective than are less permeable polymers. A general trade-off has always existed between permeability and selectivity (the so-called polymer upper bound limit). Over the past 30 years, substantial research effort has been directed to overcoming the limits imposed by this upper bound. Various polymers and techniques have been used, but without much success. In addition, traditional polymer membranes also have limitations in terms of thermal stability and contaminant resistance.

Cellulose acetate (CA) glassy polymer membranes are used extensively in gas separation. Currently, such CA membranes are used for natural gas upgrading, including the removal of carbon dioxide. Although CA membranes have many advantages, they are limited in a number of properties including selectivity, permeability, and in chemical, thermal, and mechanical stability. For example, UOP's early field practice found that polymer membrane performance can deteriorate quickly. The primary cause of loss of membrane performance is liquid condensation on the membrane surface. Condensation is prevented by providing a sufficient dew point margin for operation, based on the calculated dew point of the membrane product gas. UOP's MemGuard™ system, a regenerable adsorbent system that uses molecular sieves, was developed to remove water as well as heavy hydrocarbons from the natural gas stream, hence, to lower the dew point of the stream. The selective removal of heavy hydrocarbons by a pretreatment system can significantly improve the performance of the membranes. Although these pretreatment systems can effectively remove heavy hydrocarbons from natural gas streams to lower their dew point, the cost is quite significant. Some projects showed that the cost of the pretreatment system was as high as 10 to 40% of the total cost (pretreatment system and membrane system) depending on the feed composition. Reduction of the pretreatment system cost or total elimination of the pretreatment system would significantly reduce the membrane system cost for natural gas upgrading. On the other hand, in recent years, more and more membrane systems have been applied to large offshore natural gas upgrading projects. For offshore projects, the footprint is a big constraint. Hence, reduction of footprint is very important for offshore projects. The footprint of the pretreatment system is also very high at more than 10-50% of the footprint of the whole membrane system. Removal of the pretreatment system from the membrane system has great economical impact especially to offshore projects.

High-performance polymers such as polyimides (PIs), poly(trimethylsilylpropyne) (PTMSP), and polytriazole have been developed recently to improve membrane selectivity, permeability, and thermal stability. These polymeric membrane materials have shown promising properties for separation of gas pairs such as $CO_2/CH_4$, $O_2/N_2$, $H_2/CH_4$, and propylene/propane ($C_3H_6/C_3H_8$). However, current polymeric membrane materials have reached a limit in their productivity-selectivity trade-off relationship. In addition, gas separation processes based on the use of glassy solution-diffusion membranes frequently suffer from plasticization of the stiff polymer matrix by the sorbed penetrant molecules such as $CO_2$ or $C_3H_6$. Plasticization of the polymer as represented by the membrane structure swelling and significant increase in the permeabilities of all components in the feed occurs above the plasticization pressure when the feed gas mixture contains condensable gases.

On the other hand, some inorganic molecular sieve membranes such as SAPO-34 and carbon molecular sieve membranes offer much higher permeability and selectivity than polymeric membranes for gas separations, but are high cost, have poor mechanical stability, and are difficult for large-scale manufacture. Therefore, it is still highly desirable to provide an alternate cost-effective membrane with improved separation properties.

A recent publication in SCIENCE reported a new type of high permeability polybenzoxazole polymer membranes for gas separations (Ho Bum Park et al, SCIENCE 318, 254 (2007)). The polybenzoxazole membranes are prepared from high temperature heat treatment of hydroxy-containing polyimide polymer membranes containing pendent hydroxyl groups ortho to the heterocyclic imide nitrogen. These polybenzoxazole polymer membranes exhibited extremely high $CO_2$ permeability (>1000 Barrer) which is about 100 times better than conventional polymer membranes and similar to that of some inorganic molecular sieve membranes but lower $CO_2/CH_4$ selectivity than that of some small pore inorganic molecular sieve membranes for $CO_2/CH_4$ separation.

Based on the need for a more efficient membrane than polymer and inorganic membranes, a new type of membrane, mixed matrix membranes (MMMs), has been recently developed. Mixed matrix membranes are hybrid membranes containing fillers, such as molecular sieves, dispersed in a polymer matrix.

Much of the research conducted to date on mixed matrix membranes has focused on the combination of a dispersed solid molecular sieving phase, such as molecular sieves or carbon molecular sieves, with an easily processed continuous polymer matrix. For example, see the following patents and published patent applications: U.S. Pat. No. 6,626,980; US 2005/0268782; US 2007/0022877; and U.S. Pat. No. 7,166,146. The sieving phase in a solid/polymer mixed matrix scenario can have a selectivity that is significantly larger than that of the pure polymer. Therefore, the addition of a small volume fraction of molecular sieves to the polymer matrix can increase the overall separation efficiency significantly. Typical inorganic sieving phases in MMMs include various molecular sieves, carbon molecular sieves, and traditional silica. Many organic polymers, including cellulose acetate, polyvinyl acetate, polyetherimide (commercially Ultem®), polysulfone (commercial Udel®), polydimethylsiloxane, polyethersulfone, and several polyimides (including commercial Matrimid®), have been used as the continuous phase in MMMs.

All the molecular sieve/polymer MMMs that have been reported in the literature, however, have either much lower permeability or much lower selectivity than the recently reported new type of high permeability polybenzoxazole polymer membranes for gas separations.

The present invention overcomes the problems of both the prior art mixed matrix membranes and inorganic molecular sieve membranes by providing a new type of high performance polybenzoxazole-based mixed matrix membrane and a route to make said membrane that has the following properties/advantages: high thermal stability, significantly higher selectivity than the neat polybenzoxazole polymer membrane, and much higher permeability than traditional mixed matrix membrane.

SUMMARY OF THE INVENTION

This invention pertains to high performance polybenzoxazole-based mixed matrix membranes and methods for making and using these membranes. The high performance polybenzoxazole-based mixed matrix membranes described in the current invention are prepared by first fabricating a polyimide-based mixed matrix membrane by dispersing molecular sieve particles such as AlPO-14 molecular sieve particles in a continuous aromatic polyimide matrix with pendent hydroxyl groups ortho to the heterocyclic imide nitrogen; and then converting the polyimide-based mixed matrix membrane to a polybenzoxazole-based mixed matrix membrane by applying heat between 300° and 600° C. under inert atmosphere or vacuum.

The polybenzoxazole-based mixed matrix membranes of the present invention can be fabricated into any convenient geometry such as flat sheet (or spiral wound), disk, tube, hollow fiber, or thin film composite. These new polybenzoxazole-based mixed matrix membranes exhibit high thermal stability, significantly higher selectivity than neat polybenzoxazole polymer membranes, and much higher permeability than traditional mixed matrix membranes.

The invention provides a process for separating at least one gas or liquid from a mixture of gases or liquids using a polybenzoxazole-based mixed matrix membrane, the process comprising providing a polybenzoxazole-based mixed matrix membrane that is permeable to at least one gas or liquid; contacting the mixture of gases or liquids on one side of the polybenzoxazole-based mixed matrix membrane to cause at least one gas or liquid to permeate the polybenzoxazole-based mixed matrix membrane; and removing from the opposite side of the membrane a permeate gas or liquid composition comprising a portion of at least one gas or liquid which permeated the membrane.

The new polybenzoxazole-based mixed matrix membranes showed dramatically improved selectivity for $CO_2/CH_4$ and $H_2/CH_4$ separations compared to neat polybenzoxazole polymer membranes. For example, a polybenzoxazole-based mixed matrix membrane (designated as AlPO-14/PBO (6FDA-HAB)) prepared from poly[2,2'-bis-(3,4-dicarboxyphenyl)hexafluoropropane dianhydride-3,3'-dihydroxy-4,4'-diamino-biphenyl](poly(6FDA-HAB)) polyimide polymer and 23 wt % of AlPO-14 molecular sieve with thin plate morphology showed $P_{CO2}$ of 216 Barrers and $\alpha_{CO2/CH4}$ of 54 for $CO_2/CH_4$ separation and $P_{H2}$ of 439 Barrers and $\alpha_{H2/CH4}$ of 110 for $H_2/CH_4$ separation at 50° C. under 690 kPa (100 psig) pure gas testing pressure as compared to the neat PBO(6FDA-APAF) polymer membrane with $P_{CO2}$=197 Barrers, $\alpha_{CO2/CH4}$=33, $P_{H2}$=356 Barrers, and $\alpha_{H2/CH4}$=60.

These membranes are not only suitable for a variety of liquid, gas, and vapor separations such as desalination of water by reverse osmosis, non-aqueous liquid separation such as deep desulfurization of gasoline and diesel fuels, ethanol/water separations, pervaporation dehydration of aqueous/organic mixtures, $CO_2/CH_4$, $CO_2/N_2$, $H_2/CH_4$, $O_2/N_2$, $H_2S/CH_4$, olefin/paraffin, iso/normal paraffins separations, and other light gas mixture separations, but also can be used for other applications such as for catalysis and fuel cell applications.

DETAILED DESCRIPTION OF THE INVENTION

In 1999, Tullos et al. reported the synthesis of a series of hydroxy-containing polyimide polymers containing pendent hydroxyl groups ortho to the heterocyclic imide nitrogen. These polyimides were found to undergo thermal conversion to polybenzoxazoles upon heating between 350 and 500° C. under nitrogen or vacuum. See Tullos et al, MACROMOLECULES, 32, 3598 (1999). A recent publication in SCIENCE reported a further study that the polybenzoxazole polymer materials reported by Tullos et al. possessed tailored free volume elements with well-connected morphology. The unusual microstructure in these polybenzoxazole polymer materials was systematically tailored using thermally-driven segment rearrangement, providing a route for preparing polybenzoxazole polymer membranes for gas separations. See Ho Bum Park et al, SCIENCE, 318, 254 (2007). These polybenzoxazole polymer membranes exhibited extremely high $CO_2$ permeability (>1000 Barrer) which is similar to that of some inorganic molecular sieve membranes but lower $CO_2/CH_4$ selectivity than that of some small pore inorganic molecular sieve membranes for $CO_2/CH_4$ separation.

The present invention involves novel high performance polybenzoxazole-based mixed matrix membranes and methods for making and using these membranes. The problems of both the prior art mixed matrix membranes and inorganic molecular sieve membranes are overcome by providing a new type of high performance polybenzoxazole-based mixed matrix membrane and a route to make membranes that have ease of processability, both high selectivity and high permeability (or permeance), high thermal stability, and stable flux and sustained selectivity over time by resistance to solvent swelling, plasticization and hydrocarbon contaminants.

The high performance polybenzoxazole-based mixed matrix membranes described in the current invention are prepared from molecular sieves and a type of polyimide polymer comprising pendent hydroxyl groups ortho to the heterocyclic imide nitrogen. The introduction of the molecular sieve particles to the polybenzoxazole polymer membrane provides the membrane with significantly improved selectivity for gas separations such as $CO_2/CH_4$ separation.

The present invention provides a method for the production of the high performance polybenzoxazole-based mixed matrix membranes by fabricating a polyimide-based mixed matrix membrane by dispersing molecular sieve particles such as AlPO-14 molecular sieve particles in a continuous aromatic polyimide matrix with pendent hydroxyl groups ortho to the heterocyclic imide nitrogen; and then converting the polyimide-based mixed matrix membrane into a polybenzoxazole-based mixed matrix membrane by applying heat between 300° and 600° C. under an inert atmosphere or vacuum. In some cases a membrane post-treatment step can be added after the heating step by coating the selective layer surface of the polybenzoxazole-based mixed matrix membrane with a thin layer of high permeability material such as a polysiloxane, a fluoro-polymer, a thermally curable silicone rubber, or a UV radiation curable epoxy silicone.

The aromatic polyimides comprising pendent functional groups (e.g., —OH or —SH) ortho to the heterocyclic imide nitrogen in the polymer backbone that are used for the preparation of polybenzoxazole-based mixed matrix membranes in the present invention comprise a plurality of first repeating units of a formula (I), wherein formula (I) is:

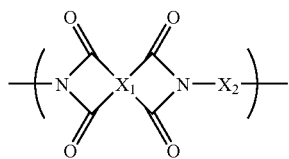

(I)

where $X_1$ of formula (I) is selected from the group consisting of

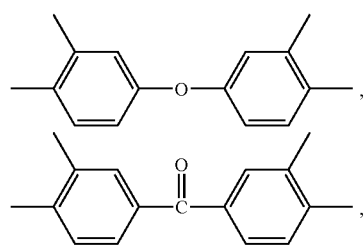

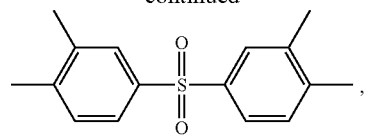

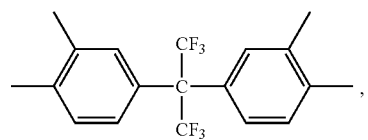

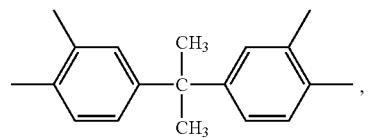

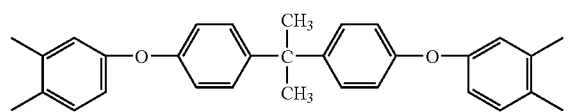

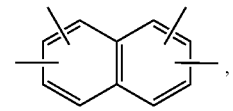

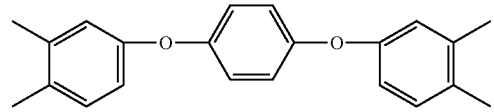

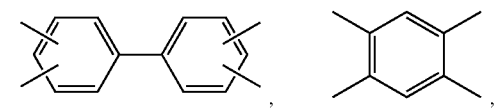

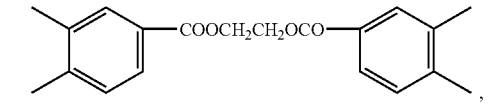

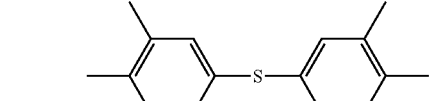

and mixtures thereof, —$X_2$— of formula (I) is selected from the group consisting of

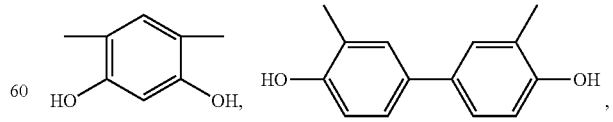

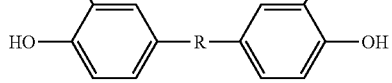

and mixtures thereof, and —R— is selected from the group consisting of

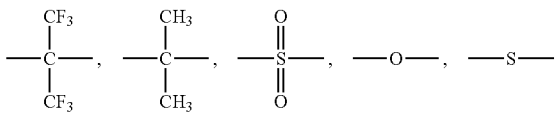

and mixtures thereof.

It is preferred that $X_1$ group of formula (I) is selected from the group consisting of

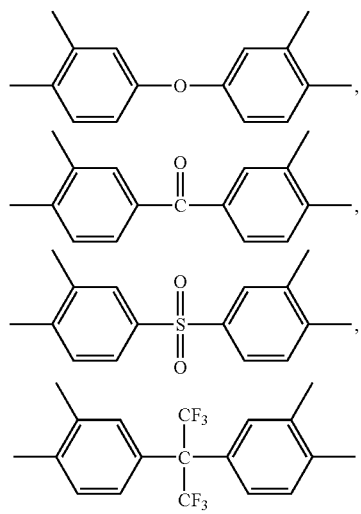

and mixtures thereof.

It is preferred that —$X_2$— group of formula (I) is selected from the group consisting of

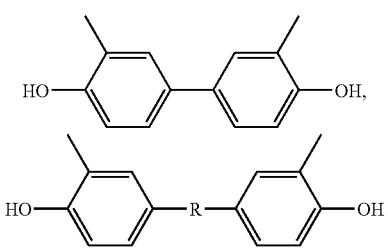

and mixtures thereof, and it is preferred that —R— group is represented by the formula:

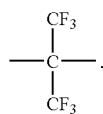

Some preferred hydroxyl functional group-containing aromatic polyimide polymers that are used for the preparation of high performance polybenzoxazole-based mixed matrix membranes in the present invention include, but are not limited to, poly[2,2'-bis-(3,4-dicarboxyphenyl)hexafluoropropane dianhydride-2,2-bis(3-amino-4-hydroxyphenyl)-hexafluoropropane](poly(6FDA-APAF)), poly[3,3',4,4'-benzophenonetetracarboxylic diaihydride-2,2-bis(3-amino-4-hydroxyphenyl)-hexafluoropropane](poly(BTDA-APAF)), poly(3,3',4,4'-benzophenonetetracarboxylic dianhydride-3,3'-dihydroxy-4,4'-diamino-biphenyl) (poly(BTDA-HAB)), poly[4,4'-oxydiphthalic anhydride-2,2-bis(3-amino-4-hydroxyphenyl)-hexafluoropropane](poly(ODPA-APAF)), poly[3,3',4,4'-diphenylsulfone tetracarboxylic dianhydride-2,2-bis(3-amino-4-hydroxyphenyl)-hexafluoropropane](poly(DSDA-APAF)), poly(3,3',4,4'-diphenylsulfone tetracarboxylic dianhydride-2,2-bis(3-amino-4-hydroxyphenyl)-hexafluoropropane-3,3'-dihydroxy-4,4'-diamino-biphenyl) (poly(DSDA-APAF-HAB)), poly[2,2'-bis-(3,4-dicarboxyphenyl)hexafluoropropane diaihydride-3,3',4,4'-benzophenonetetracarboxylic dianhydride-2,2-bis(3-amino-4-hydroxyphenyl)-hexafluoropropane](poly(6FDA-BTDA-APAF)), poly[4,4'-oxydiphthalic anhydride-2,2-bis(3-amino-4-hydroxyphenyl)-hexafluoropropane-3,3'-dihydroxy-4,4'-diamino-biphenyl](poly(ODPA-APAF-HAB)), poly[3,3',4,4'-benzophenonetetracarboxylic dianhydride-2,2-bis(3-amino-4-hydroxyphenyl)-hexafluoropropane-3,3'-dihydroxy-4,4'-diamino-biphenyl](poly(BTDA-APAF-HAB)), poly[2,2'-bis-(3,4-dicarboxyphenyl)hexafluoropropane dianhydride-3,3'-dihydroxy-4,4'-diamino-biphenyl](poly(6FDA-HAB)), and poly(4,4'-bisphenol A dianhydride-3,3',4,4'-benzophenonetetracarboxylic dianhydride-2,2-bis(3-amino-4-hydroxyphenyl)-hexafluoropropane](poly(BPADA-BTDA-APAF)).

The hydroxyl functional group-containing aromatic polyimide polymers that are used for the preparation of high performance polybenzoxazole-based mixed matrix membranes in the present invention are synthesized from diamines and dianhydrides in polar solvents such as 1-methyl-2-pyrrolidione (NMP) or N,N-dimethylacetamide (DMAc) by a two-step process involving the formation of the poly(amic acid)s followed by a solution imidization or a thermal imidization. Acetic anhydride is a preferred dehydrating agent and pyridine (or triethylamine) is a preferred imidization catalyst for the solution imidization reaction.

The molecular sieves in the polybenzoxazole-based mixed matrix membranes provided in this invention can have a selectivity that is significantly higher than the neat polybenzoxazole membranes for separations. Addition of a small weight percent of the appropriate molecular sieves to the polybenzoxazole matrix increases the overall separation efficiency significantly. The molecular sieves used in the polybenzoxazole-based mixed matrix membranes include microporous and mesoporous molecular sieves, carbon molecular sieves, and porous metal-organic frameworks (MOFs).

Molecular sieves improve the performance of the polybenzoxazole-based mixed matrix membrane by including selective holes or pores having a diameter that permits a particular gas such as carbon dioxide to pass through, but either does not permit another gas such as methane to pass through, or permits it to pass through at a significantly slower rate resulting in a significant purification or separation to occur. In order to provide an advantage, the molecular sieves need to have higher selectivity for the desired separation than the original polybenzoxazole to enhance the performance of the membranes. It is preferred that the steady-state permeability of the faster permeating gas component in the molecular sieves be at least equal to that of the faster permeating gas in the original polybenzoxazole matrix phase.

Molecular sieves have framework structures which may be characterized by distinctive wide-angle X-ray diffraction patterns. Zeolites are a subclass of molecular sieves based on an aluminosilicate composition. Non-zeolitic molecular sieves are based on other compositions such as aluminophosphates, silico-aluminophosphates, and silica. Molecular sieves of different chemical compositions can have the same or different framework structures.

Zeolites can be further broadly described as molecular sieves in which complex aluminosilicate molecules assemble to define a three-dimensional framework structure enclosing cavities occupied by ions and water molecules which can move with significant freedom within the zeolite matrix. In commercially useful zeolites, the water molecules can be removed or replaced without destroying the framework structure. Zeolite compositions can be represented by the following formula: $M_{2/n}O:Al_2O_3:xSiO_2:yH_2O$, wherein M is a cation of valence n, x is greater than or equal to 2, and y is a number determined by the porosity and the hydration state of the zeolites, generally from 0 to 8. In naturally occurring zeolites, M is principally represented by Na, Ca, K, Mg and Ba in proportions usually reflecting their approximate geochemical abundance. The cations are loosely bound to the structure and can frequently be completely or partially replaced with other cations or hydrogen by conventional ion exchange. Acid forms of molecular sieve sorbents can be prepared by a variety of techniques including ammonium exchange followed by calcination or by direct exchange of alkali ions for protons using mineral acids or ion exchangers.

Microporous molecular sieve materials are microporous crystals with pores of a well-defined size ranging from about 0.2 to 2 nm. This discrete porosity provides molecular sieving properties to these materials which have found wide applications as catalysts and sorption media. Molecular sieve structure types can be identified by their structure type code as assigned by the IZA Structure Commission following the rules set up by the IUPAC Commission on Zeolite Nomenclature. Each unique framework topology is designated by a structure type code consisting of three capital letters. Exemplary compositions of such small pore alumina containing molecular sieves include non-zeolitic molecular sieves (NZMS) comprising certain aluminophosphates (AlPO's), silicoaluminophosphates (SAPO's), metallo-aluminophosphates (MeAPO's), elemental aluminophosphates (ElAPO's), metallo-silicoaluminophosphates (MeAPSO's) and elemental silicoaluminophosphates (ElAPSO's). Representative examples of microporous molecular sieves that can be used in the present invention are small pore molecular sieves such as SAPO-34, Si-DDR, UZM-9, AlPO-14, AlPO-34, AlPO-53, AlPO-17, SSZ-62, AlPO-18, ERS-12, CDS-1, MCM-65, MCM-47, 4A, 5A, UZM-5, UZM-12, AlPO-34, SAPO-44, SAPO-47, SAPO-17, CVX-7, SAPO-35, SAPO-56, AlPO-52, SAPO-43, medium pore molecular sieves such as silicalite-1, and large pore molecular sieves such as NaX, NaY, and CaY.

Another type of molecular sieves used in the polybenzoxazole-based mixed matrix membranes provided in this invention is mesoporous molecular sieves with pore size ranging from 2 nm to 50 nm. Examples of preferred mesoporous molecular sieves include MCM-41, SBA-15, and surface functionalized MCM-41 and SBA-15.

Metal-organic frameworks (MOFs) can also be used as the molecular sieves in the polybenzoxazole-based mixed matrix membranes described in the present invention. MOFs are a new type of highly porous crystalline zeolite-like materials and are composed of rigid organic units assembled by metal-ligands. They possess vast accessible surface areas per unit mass. A number of journal articles discuss MOFs including the following: Yaghi et al., SCIENCE, 295: 469 (2002); Yaghi et al., MICROPOR. MESOPOR. MATER., 73: 3 (2004); Dybtsev et al., ANGEW. CHEM. INT. ED., 43: 5033 (2004). MOF, IR-MOF and MOP materials exhibit analogous behaviour to that of conventional microporous materials such as large and accessible surface areas, with interconnected intrinsic micropores. Moreover, they may reduce the hydrocarbon fouling problem of polyimide membranes due to relatively larger pore sizes than those of zeolite materials. MOF, IR-MOF and MOP materials allow the polymer to infiltrate the pores, improve the interfacial and mechanical properties and would in turn affect permeability. Therefore, these MOF, IR-MOF and MOP materials (all termed "MOF" herein) are used as molecular sieves in the preparation of polybenzoxazole-based mixed matrix membranes in the present invention.

The particle size of the molecular sieves dispersed in the continuous polybenzoxazole matrix of the polybenzoxazole-based mixed matrix membranes in the present invention should be small enough to form a uniform dispersion of the particles in the concentrated suspensions from which the polybenzoxazole-based mixed matrix membranes will be fabricated. The median particle size should be less than about 10 μm, preferably less than 5 μm, and more preferably less than 1 μm. Most preferably, nano-molecular sieves (or "molecular sieve nanoparticles") should be used in the polybenzoxazole-based mixed matrix membranes of the current invention.

Nano-molecular sieves described herein are sub-micron size molecular sieves with particle sizes in the range of 5 to 500 nm. Nano-molecular sieve selection for the preparation of polybenzoxazole-based mixed matrix membranes includes screening the dispersity of the nano-molecular sieves in organic solvent, the porosity, particle size, morphology, and surface functionality of the nano-molecular sieves, the adhesion or wetting property of the nano-molecular sieves with the polybenzoxazole matrix. Nano-molecular sieves for the preparation of polybenzoxazole-based mixed matrix membranes should have suitable pore size to allow selective permeation of a smaller sized gas, and also should have appropriate particle size in the nanometer range to prevent defects in the membranes. The nano-molecular sieves should be easily dispersed without agglomeration in the polybenzoxazole matrix to maximize the transport property.

The nano-molecular sieves described herein are usually synthesized from initially clear solutions. Representative examples of nano-molecular sieves suitable to be incorporated into the polybenzoxazole-based mixed matrix membranes described herein include Si-MFI (or silicalite-1), SAPO-34, Si-DDR, AlPO-14, AlPO-34, AlPO-18, AlPO-17, AlPO-53, AlPO-52, SSZ-62, UZM-5, UZM-9, UZM-12, UZM-25, CDS-1, ERS-12, MCM-65 and mixtures thereof.

The polyimide-based mixed matrix membrane that is used for the preparation of high performance polybenzoxazole-based mixed matrix membrane in the present invention can be fabricated into a membrane with a nonporous symmetric thin film geometry from molecular sieve particles and the hydroxyl functional group-containing polyimide polymer by casting a molecular sieve/polyimide mixed matrix solution into a glass ring on top of a clean glass plate and allowing the solvent to evaporate slowly inside a plastic cover for at least 12 hours at room temperature. The membrane is then detached from the glass plate and dried at room temperature for 24 hours and then at 200° C. for at least 48 hours under vacuum.

The solvents used for dissolving the polyimide polymer are chosen primarily for their ability to completely dissolve the polymers and for ease of solvent removal in the membrane formation steps. Other considerations in the selection of solvents include low toxicity, low corrosive activity, low environmental hazard potential, availability and cost. Representative solvents for use in this invention include most amide solvents that are typically used for the formation of polymeric membranes, such as N-methylpyrrolidone (NMP) and N,N-dimethyl acetamide (DMAC), methylene chloride, tetrahydrofuran (THF), acetone, N,N-dimethylformamide (DMF), dimethyl sulfoxide (DMSO), toluene, dioxanes, 1,3-dioxolane, mixtures thereof, others known to those skilled in the art and mixtures thereof.

The polyimide-based mixed matrix membrane that is used for the preparation of high performance polybenzoxazole-based mixed matrix membrane in the present invention can also be fabricated by a method comprising the steps of: preparing a molecular sieve/polyimide mixed matrix suspension by dispersing molecular sieve particles in a polyimide polymer solution; contacting a porous membrane support (e.g., a support made from an inorganic ceramic material) with said suspension; and evaporating the solvent to provide a thin selective layer comprising the molecular sieve/polyimide mixed matrix material on the supporting layer.

The polyimide-based mixed matrix membrane that is used for the preparation of high performance polybenzoxazole-based mixed matrix membrane in the present invention can also be fabricated as an asymmetric membrane with flat sheet or hollow fiber geometry by phase inversion followed by direct air drying through the use of at least one drying agent which is a hydrophobic organic compound such as a hydrocarbon or an ether (see U.S. Pat. No. 4,855,048). The polyimide-based mixed matrix membrane that is used for the preparation of high performance polybenzoxazole-based mixed matrix membrane in the present invention can also be fabricated as an asymmetric membrane with flat sheet or hollow fiber geometry by phase inversion followed by solvent exchange methods (see U.S. Pat. No. 3,133,132).

The polyimide-based mixed matrix membrane is then converted to polybenzoxazole-based mixed matrix membrane by heating between 300° and 600° C., preferably from about 400° C. to 500° C. and most preferably from about 400° C. to 450° C. under inert atmosphere, such as argon, nitrogen, or vacuum. The heating time for this heating step is in a range of about 30 seconds to 2 hours. A more preferred heating time is from 30 seconds to 1 hour. In some cases a membrane post-treatment step can be added after the formation of the polybenzoxazole-based mixed matrix membrane with a thin layer of high permeability material such as a polysiloxane, a fluoropolymer, a thermally curable silicone rubber, or a UV radiation curable epoxy silicone. The coating filling the surface pores and other imperfections comprising voids (see U.S. Pat. No. 4,230,463; U.S. Pat. No. 4,877,528; U.S. Pat. No. 6,368,382).

The high performance polybenzoxazole-based mixed matrix membranes of the present invention can have either a nonporous symmetric structure or an asymmetric structure with a thin nonporous dense selective layer supported on top of a porous support layer. The porous support can be made from the same polybenzoxazole-based mixed matrix material or a different type of material with high thermal stability. The mixed matrix membranes can be fabricated into any convenient geometry such as flat sheet (or spiral wound), disk, tube, hollow fiber, or thin film composite.

The invention provides a process for separating at least one gas or liquid from a mixture of gases or liquids using the polybenzoxazole-based mixed matrix membranes described in the present invention, the process comprising providing a polybenzoxazole-based mixed matrix membrane which is permeable to at least one gas or liquid; contacting the mixture on one side of the polybenzoxazole-based mixed matrix membrane to cause said at least one gas or liquid to permeate the polybenzoxazole-based mixed matrix membrane and removing from the opposite side of the membrane a permeate gas or liquid composition comprising a portion of the at least one gas or liquid which permeated the membrane.

The high performance polybenzoxazole-based mixed matrix membranes of the present invention are especially useful in the purification, separation or adsorption of a particular species in the liquid or gas phase. In addition to separation of pairs of gases, these high performance polybenzoxazole-based mixed matrix membranes may, for example, be used for the desalination of water by reverse osmosis or for the separation of proteins or other thermally unstable compounds, e.g. in the pharmaceutical and biotechnology industries. The polybenzoxazole-based mixed matrix membranes may also be used in fermenters and bioreactors to transport gases into the reaction vessel and transfer cell culture medium out of the vessel. Additionally, the polybenzoxazole-based mixed matrix membranes may be used for the removal of microorganisms from air or water streams, water purification, ethanol production in a continuous fermentation/membrane pervaporation system, and in detection or removal of trace compounds or metal salts in air or water streams.

The polybenzoxazole-based mixed matrix membranes of the present invention are especially useful in gas separation processes in air purification, petrochemical, refinery, and natural gas industries. Examples of such separations include separation of volatile organic compounds (such as toluene, xylene, and acetone) from an atmospheric gas, such as nitrogen or oxygen and nitrogen recovery from air. Further examples of such separations are for the separation of $CO_2$ or $H_2S$ from natural gas, $H_2$ from $N_2$, $CH_4$, and Ar in ammonia purge gas streams, $H_2$ recovery in refineries, olefin/paraffin separations such as propylene/propane separation, and iso/normal paraffin separations. Any given pair or group of gases that differ in molecular size, for example nitrogen and oxygen, carbon dioxide and methane, hydrogen and methane or carbon monoxide, helium and methane, can be separated using the polybenzoxazole-based mixed matrix membranes described herein. More than two gases can be removed from a third gas. For example, some of the gas components which can be selectively removed from a raw natural gas using the membrane described herein include carbon dioxide, oxygen, nitrogen, water vapor, hydrogen sulfide, helium, and other trace gases. Some of the gas components that can be selectively retained include hydrocarbon gases. When permeable components are acid components selected from the group consisting of carbon dioxide, hydrogen sulfide, and mixtures thereof and are removed from a hydrocarbon mixture such as natural gas, one module, or at least two in parallel service, or a series of modules may be utilized to remove the acid components. For example, when one module is utilized, the pressure of the feed gas may vary from 275 kPa to about 2.6 MPa (25 to 4000 psi). The differential pressure across the membrane can be as low as about 0.7 bar or as high as 145 bar (about 10 psi or as high as about 2100 psi) depending on many factors such as the particular membrane used, the flow rate of the inlet stream and the availability of a compressor to compress the permeate stream if such compression is desired. Differential pressure greater than about 145 bar (2100 psi) may rupture the membrane. A differential pressure of at least 7 bar (100 psi) is preferred since lower differential pressures may require more modules, more time and compression of intermediate product streams. The operating temperature of the process may vary depending upon the temperature of the feed stream and upon ambient temperature conditions. Preferably, the effective operating temperature of the membranes of the present invention will range from about −50° to about 100° C. More preferably, the effective operating temperature of the membranes of the present invention will range from about −20° to about 70° C., and most preferably, the effective operating temperature of the membranes of the present invention will be less than about 70° C.

The polybenzoxazole-based mixed matrix membranes described in the current invention are also especially useful in gas/vapor separation processes in chemical, petrochemical, pharmaceutical and allied industries for removing organic vapors from gas streams, e.g. in off-gas treatment for recovery of volatile organic compounds to meet clean air regulations, or within process streams in production plants so that valuable compounds (e.g., vinylchloride monomer, propylene) may be recovered. Further examples of gas/vapor separation processes in which these polybenzoxazole-based mixed matrix membranes may be used are hydrocarbon vapor separation from hydrogen in oil and gas refineries, hydrocarbon dew pointing of natural gas (i.e. to decrease the hydrocarbon dew point to below the lowest possible export pipeline temperature so that liquid hydrocarbons do not separate in the pipeline), for control of methane number in fuel gas for gas engines and gas turbines, and for gasoline recovery. The polybenzoxazole-based mixed matrix membranes may incorporate a species that adsorbs strongly to certain gases (e.g. cobalt porphyrins or phthalocyanines for $O_2$ or silver (I) for ethane) to facilitate their transport across the membrane.

The polybenzoxazole-based mixed matrix membranes can also be operated at high temperatures to provide sufficient dew point margin for natural gas upgrading (e.g, $CO_2$ removal from natural gas). The polybenzoxazole-based mixed matrix membrane can be used in either a single stage membrane or as the first or/and second stage membrane in a two stage membrane system for natural gas upgrading. The polybenzoxazole-based mixed matrix membranes with high selectivity, high permeance, and high thermal and chemical stabilities of the present invention may allow the membrane to be operated without a costly pretreatment system. Due to the elimination of a pretreatment system and a significant reduction of membrane area, the new process can achieve significant capital cost saving and reduce the existing membrane footprint.

These polybenzoxazole-based mixed matrix membranes may also be used in the separation of liquid mixtures by pervaporation, such as in the removal of organic compounds (e.g., alcohols, phenols, chlorinated hydrocarbons, pyridines, ketones) from water such as aqueous effluents or process fluids. A membrane which is ethanol-selective would be used to increase the ethanol concentration in relatively dilute ethanol solutions (5-10% ethanol) obtained by fermentation processes. Another liquid phase separation example using these polybenzoxazole-based mixed matrix membranes is the deep desulfurization of gasoline and diesel fuels by a pervaporation membrane process similar to the process described in U.S. Pat. No. 7,048,846, incorporated by reference herein in its entirety. The polybenzoxazole-based mixed matrix membranes that are selective to sulfur-containing molecules would be used to selectively remove sulfur-containing molecules from fluid catalytic cracking (FCC) and other naphtha hydrocarbon streams. Further liquid phase examples include the separation of one organic component from another organic component, e.g. to separate isomers of organic compounds. Mixtures of organic compounds which may be separated using the polybenzoxazole-based mixed matrix membrane include: ethylacetate-ethanol, diethylether-ethanol, acetic acid-ethanol, benzene-ethanol, chloroform-ethanol, chloroform-methanol, acetone-isopropylether, allylalcohol-allylether, allylalcohol-cyclohexane, butanol-butylacetate, butanol-1-butylether, ethanol-ethylbutylether, propylacetate-propanol, isopropylether-isopropanol, methanol-ethanol-isopropanol, and ethylacetate-ethanol-acetic acid.

The polybenzoxazole-based mixed matrix membranes may be used for separation of organic molecules from water (e.g. ethanol and/or phenol from water by pervaporation) and removal of metal and other organic compounds from water.

The polybenzoxazole-based mixed matrix membranes described in the current invention have particular application for the separation of gas mixtures including carbon dioxide removal from natural gas. The polybenzoxazole-based mixed matrix membrane permits carbon dioxide to diffuse through at a faster rate than the methane in the natural gas. Carbon dioxide has a higher permeation rate than methane because of higher solubility, higher diffusivity, or both. Thus, carbon dioxide enriches on the permeate side of the membrane, and methane enriches on the feed (or reject) side of the membrane.

The polybenzoxazole-based mixed matrix membranes described in the current invention also have immediate application to concentrate olefin in a paraffin/olefin stream for olefin cracking application. For example, the polybenzoxazole-based mixed matrix membranes can be used for propylene/propane separation to increase the concentration of effluent in a catalytic dehydrogenation technology for the production of propylene from propane and isobutylene from isobutane. Therefore, the number of stages of propylene/propane splitter that is required to get polymer grade propylene can be reduced. Another application for the polybenzoxazole-based mixed matrix membranes is for separating isoparaffin and normal paraffin in light paraffin isomerization and MaxEne MaxEne™, a process for enhancing the concentration of normal paraffin (n-paraffin) in the naphtha cracker feedstock, which can be then converted to ethylene.

An additional application of the polybenzoxazole-based mixed matrix membranes is as the separator in chemical reactors to enhance the yield of equilibrium-limited reactions by selective removal of a specific compound.

Yet another application of the new polybenzoxazole-based mixed matrix membranes described in the current invention is as the catalytic membranes by loading metal catalysts or polymer-anchored metal catalysts, or molecular sieve catalysts to the polybenzoxazole-based mixed matrix membranes. These new polybenzoxazole-based mixed matrix membranes are suitable for a variety of catalysis applications that are of interest such as selective hydrogenation reactions to remove feed or product impurities, solid acid motor fuel alkylation (alkylene), ethylbenzene and cumene alkylation, detergent alkylation, $C_3$-$C_5$ light olefin oligomerization, Tatoray™ process for producing benzene from toluene and certain other aromatic hydrocarbons licensed by UOP LLC, Des Plaines, Ill., selective ethylene benzene to paraxylene isomerization, and other reactions. The control of adsorption and diffusion properties by tailoring the characteristics of both the polybenzoxazole-based mixed matrix membrane and catalyst components can greatly improve process efficiency that can only be achieved in systems of liquid acids or bases, where great efficiency is achieved via great partition of one reactant relative to others or the reactants relative to product. These polybenzoxazole-based mixed matrix membranes possess many advantages over traditional catalysts for the above-mentioned catalysis applications.

As an example, the advantages of these new polybenzoxazole-based mixed matrix membranes for selective hydrogenation reactions such as selective hydrogenation of propadiene and propyne and selective hydrogenation of butadiene include: 1) taking advantage of the catalytic membrane reactor concept by combining chemical reactions with the catalytic and separation activities of the membranes; 2) controllable $H_2$ concentration; 3) adjustable $H_2$/feed ratio, etc. These advanced characteristics will improve the reaction yield and selectivity simultaneously for selective hydrogenation reactions.

Yet another application of the new polybenzoxazole-based mixed matrix membranes described in the current invention is as the novel efficient proton-conducting membrane for fuel cell application. The development of efficient proton-conducting membrane is of the greatest importance for the design and improvement of low-temperature fuel cells including proton exchange membrane fuel cells (PEMFCs) and direct methanol fuel cells (DMFCs). PEMFC is one of the most attractive power sources for a variety of applications by virtue of its high efficiency and environment friendly nature. During the past two decades most of the activity in the field of proton-conducting membranes has been undertaken by the materials science community whose major motivation has been to develop suitable proton conducting materials for application as proton conducting membranes for fuel cells. The breakthrough of the PEMFC and DMFC technologies has been however still inhibited, mainly due to the lack of suitable materials for proton-conducting membrane applications. Optimized proton and water transport properties of the membrane are crucial for efficient fuel cell operation. Dehydration of the membrane reduces proton conductivity while excess of water can lead to flooding of the electrodes, both conditions may result in poor cell performance.

The new polybenzoxazole-based mixed matrix membranes described in the current invention are expected to exhibit significantly improved performance as proton-conducting membranes for fuel cell applications compared to traditional Nafion® polymer membranes because of their excellent proton conducting property, high water adsorption capacity, and high chemical and thermal stability.

In summary, the high performance polybenzoxazole-based mixed matrix membranes of the present invention are not only suitable for a variety of liquid, gas, and vapor separations such as desalination of water by reverse osmosis, non-aqueous liquid separation such as deep desulfurization of gasoline and diesel fuels, ethanol/water separations, pervaporation dehydration of aqueous/organic mixtures, $CO_2/CH_4$, $CO_2/N_2$, $H_2/CH_4$, $O_2/N_2$, $H_2S/CH_4$, olefin/paraffin, iso/normal paraffins separations, and other light gas mixture separations, but also can be used for other applications such as for catalysis and fuel cell applications.

The following examples are provided to illustrate one or more preferred embodiments of the invention, but are not limited embodiments thereof. Numerous variations can be made to the following examples that lie within the scope of the invention.

EXAMPLE 1

Synthesis of poly(6FDA-HAB)polyimide

A aromatic poly[2,2'-bis-(3,4-dicarboxyphenyl)hexafluoropropane dianhydride-3,3'-dihydroxy-4,4'-diamino-biphenyl](poly(6FDA-HAB))polyimide containing pendent —OH functional groups ortho to the heterocyclic imide nitrogen in the polymer backbone was synthesized from 2,2'-bis-(3,4-dicarboxyphenyl)hexafluoropropane dianhydride (6FDA) and 3,3'-dihydroxy-4,4'-diamino-biphenyl (HAB) in NMP polar solvent by a two-step process involving the formation of the poly(amic acid) followed by a solution imidization process. Acetic anhydride was used as the dehydrating agent and pyridine was used as the imidization catalyst for the solution imidization reaction. In this example, a 250 mL three-neck round-bottom flask equipped with a nitrogen inlet and a mechanical stirrer was charged with 5.9 g (27.3 mmol) of HAB and 40 mL of NMP. Once HAB was fully dissolved, a solution of 6FDA (12.1 g, 27.3 mmol) in 40 mL of NMP was added to the HAB solution in the flask. The reaction mixture was mechanically stirred for 24 hours at ambient temperature to give a viscous poly(amic acid) solution. Then 11.1 g of acetic anhydride in 10 mL of NMP was added slowly to the reaction mixture under stirring followed by the addition of 8.6 g of pyridine in 10 mL of NMP to the reaction mixture. The reaction mixture was mechanically stirred for an additional 1 hour at 80° C. to yield the poly(6FDA-HAB)polyimide. The poly(6FDA-HAB)polyimide product in a fine fiber form was recovered by slowly precipitating the reaction mixture into a large amount of methanol. The resultant poly(6FDA-HAB) polyimide fibers were then thoroughly rinsed with methanol and dried in a vacuum oven at 150° C. for 24 hours.

EXAMPLE 2

Preparation of AlPO-14/poly(6FDA-HAB) Mixed Matrix Membrane

An AlPO-14/poly(6FDA-HAB) mixed matrix membrane containing 30 wt-% of dispersed AlPO-14 molecular sieve with thin plate morphology in a poly(6FDA-HAB) polyimide continuous matrix (AlPO-14/poly(6FDA-HAB)) was prepared as follows: 2.4 g of AlPO-14 molecular sieves (prepared in accordance with the process disclosed in U.S. Ser. No. 11/941,445 filed Nov. 16, 2007, incorporated by reference herein in its entirety) were dispersed in a mixture of 14.0 g of NMP and 20.6 g of 1,3-dioxolane by mechanical stirring and ultrasonication for 1 hour to form a slurry. Then 8.0 g of poly(6FDA-HAB)polyimide polymer was added to the slurry and the resulting mixture was stirred for 2 hours to form a stable casting dope containing 30 wt-% of dispersed AlPO-14 molecular sieves (weight ratio of AlPO-14 to poly(6FDA-HAB) is 30:100) in the continuous poly(6FDA-HAB)polymer matrix. The stable casting dope was allowed to degas overnight.

An AlPO-14/poly(6FDA-HAB) mixed matrix membrane was prepared on a clean glass plate from the bubble free stable casting dope using a doctor knife with a 20-mil gap. The film together with the glass plate was then put into a vacuum oven. The solvents were removed by slowly increasing the vacuum and the temperature of the vacuum oven. Finally, the membrane was dried at 200° C. under vacuum for at least 48 hours to completely remove the residual solvents to form AlPO-14/poly(6FDA-HAB) mixed matrix membrane.

EXAMPLE 3

Preparation of AlPO-14/PBO(6FDA-HAB) Mixed Matrix Membrane

The AlPO-14/poly(6FDA-HAB) mixed matrix membrane prepared in Example 2 was thermally heated from 50° to 400° C. at a heating rate of 5° C./min under $N_2$ flow. The membrane was held for 1 hour at 400° C. and then cooled down to 50° C.

at a heating rate of 5° C./min under $N_2$ flow to yield AlPO-14/poly(6FDA-HAB) mixed matrix membrane.

EXAMPLE 4

Preparation of "Control" poly(6FDA-HAB)polyimide Membrane

The "control" poly(6FDA-HAB)polyimide membrane was prepared as follows: 4.5 g of poly(6FDA-HAB)polyimide synthesized in Example 1 was dissolved in a solvent mixture of 12.0 g of NMP and 12.0 g of 1,3-dioxolane. The mixture was mechanically stirred for 2 hours to form a homogeneous casting dope. The resulting homogeneous casting dope was allowed to degas overnight. The poly(6FDA-HAB) polymer membrane was prepared from the bubble free casting dope on a clean glass plate using a doctor knife with a 20-mil gap. The membrane together with the glass plate was then put into a vacuum oven. The solvents were removed by slowly increasing the vacuum and the temperature of the vacuum oven. Finally, the membrane was dried at 200° C. under vacuum for at least 48 hours to completely remove the residual solvents to form a poly(6FDA-HAB)polyimide membrane.

EXAMPLE 5

Preparation of PBO(6FDA-HAB) Membrane by Heat Treatment

The poly(6FDA-HAB) membrane was thermally heated from 50° C. to 400° C. at a heating rate of 5° C./min under $N_2$ flow. The membrane was held for 1 hour at 400° C. and then cooled down to 50° C. at a heating rate of 5° C./min under $N_2$ flow to yield PBO(6FDA-HAB) membrane.

EXAMPLE 6

$CO_2/CH_4$ Separation Performance of PBO(6FDA-HAB) and AlPO-14/PBO(6FDA-HAB) Membranes The PBO(6FDA-HAB)polymer membrane and AlPO-14/PBO(6FDA-HAB) mixed matrix membranes were tested for $CO_2/CH_4$ separation under a testing temperature of 50° C. (Table 1). It can be seen from Table 1 that the AlPO-14/PBO (6FDA-HAB) mixed matrix membrane showed over a 60% increase in $CO_2/CH_4$ selectivity (54 at 50° C. testing temperature) compared to the PBO(6FDA-HAB) membrane.

TABLE 1

Pure gas permeation test results of PBO(6FDA-HAB) AlPO-14/PBO(6FDA-HAB) membranes for $CO_2/CH_4$ Separation[a]

| Membrane | $P_{CO2}$ (Barrer) | $\alpha_{CO2/CH4}$ |
|---|---|---|
| PBO(6FDA-HAB) | 197.3 | 33.3 |
| AlPO-14/PBO(6FDA-HAB) | 215.7 | 53.9 |

[a]$P_{CO2}$ and $P_{CH4}$ were tested at 50° C. and 690 kPa (100 psig);
1 Barrer = $10^{-10}$ cm$^3$ (STP) · cm/cm$^2$ · sec · cmHg.

EXAMPLE 7

$H_2/CH_4$ Separation Performance of PBO(6FDA-HAB) and AlPO-14/PBO(6FDA-HAB) Membranes The PBO(6FDA-HAB)polymer membrane and AlPO-14/PBO(6FDA-HAB) mixed matrix membranes were tested for $H_2/CH_4$ separation under a testing temperature of 50° C. (Table 2). It can be seen from Table 2 that the AlPO-14/PBO (6FDA-HAB) mixed matrix membrane showed over 80% greater $H_2/CH_4$ selectivity (110 at 50° C. testing temperature) compared to the PBO(6FDA-HAB) membrane.

TABLE 2

Pure gas permeation test results of PBO(6FDA-HAB) AlPO-14/PBO(6FDA-HAB) membranes for $H_2/CH_4$ Separation[a]

| Membrane | $P_{H2}$ (Barrer) | $\alpha_{H2/CH4}$ |
|---|---|---|
| PBO(6FDA-HAB) | 355.8 | 60.0 |
| AlPO-14/PBO(6FDA-HAB) | 439.2 | 109.8 |

[a]$P_{H2}$ and $P_{CH4}$ were tested at 50° C. and 690 kPa (100 psig);
1 Barrer = $10^{-10}$ cm$^3$ (STP) · cm/cm$^2$ · sec · cmHg.

EXAMPLE 8

Synthesis of poly(BTDA-APAF-HAB)polyimide

An aromatic poly[3,3',4,4'-benzophenonetetracarboxylic dianhydride-2,2-bis(3-amino-4-hydroxyphenyl)-hexafluoropropane-3,3'-dihydroxy-4,4'-diamino-biphenyl](poly (BTDA-APAF-HAB))polyimide containing pendent —OH functional groups ortho to the heterocyclic imide nitrogen in the polymer backbone was synthesized from 3,3',4,4'-benzophenonetetracarboxylic dianhydride (BTDA), 2,2-bis(3-amino-4-hydroxyphenyl)-hexafluoropropane (APAF), and 3,3'-dihydroxy-4,4'-diamino-biphenyl (HAB) with 3:2:1 molar ratio in anhydrous NMP polar solvent by a two-step process involving the formation of the poly(amic acid) followed by a solution imidization process. Acetic anhydride was used as the dehydrating agent and pyridine was used as the imidization catalyst for the solution imidization reaction. For example, a 250 mL three-neck round-bottom flask equipped with a nitrogen inlet and a mechanical stirrer was charged with 6.67 g (18.2 mmol) of APAF and 1.97 g (9.1 mmol) of HAB and 40 mL of NMP. Once APAF and HAB were fully dissolved, a solution of BTDA (8.8 g, 27.3 mmol) in 40 mL of NMP was added to the APAF and HAB solution in the flask. The reaction mixture was mechanically stirred for 24 hours at ambient temperature to give a viscous poly(amic acid) solution. Then 11.1 g of acetic anhydride in 10 mL of NMP was added slowly to the reaction mixture under stirring followed by the addition of 8.6 g of pyridine in 10 mL of NMP to the reaction mixture. The reaction mixture was mechanically stirred for an additional 1 h at 80° C. to yield the poly(BTDA-APAF-HAB)polyimide. The poly(BTDA-APAF-HAB)polyimide product in a fine fiber form was recovered by slowly precipitating the reaction mixture into a large amount of methanol. The resultant poly(BTDA-APAF-HAB)polyimide fibers were then thoroughly rinsed with methanol and dried in a vacuum oven at 100° C. for 24 hours.

EXAMPLE 9

Preparation of AlPO-14/poly(BTDA-APAF-HAB) Mixed Matrix Membrane

An AlPO-14/poly(BTDA-APAF-HAB) mixed matrix membrane containing 30 wt-% of dispersed AlPO-14 molecular sieve with thin plate morphology in the poly (BTDA-APAF-HAB)polyimide continuous matrix (AlPO-14/poly(BTDA-APAF-HAB)) was prepared as follows: 2.4 g of AlPO-14 molecular sieves were dispersed in a mixture of 14.0 g of NMP and 20.6 g of 1,3-dioxolane by mechanical stirring and ultrasonication for 1 hour to form a slurry. Then 8.0 g of poly(BTDA-APAF-HAB)polyimide polymer was added to the slurry and the resulting mixture was stirred for 2 hours to form a stable casting dope containing 30 wt-% of dispersed AlPO-14 molecular sieves (weight ratio of AlPO-14 to poly(BTDA-APAF-HAB) is 30:100) in the continuous poly(BTDA-APAF-HAB)polymer matrix. The stable casting dope was allowed to degas overnight.

An AlPO-14/poly(BTDA-APAF-HAB) mixed matrix membrane was prepared on a clean glass plate from the bubble free stable casting dope using a doctor knife with a 20-mil gap. The film together with the glass plate was then put into a vacuum oven. The solvents were removed by slowly increasing the vacuum and the temperature of the vacuum oven. Finally, the membrane was dried at 200° C. under vacuum for at least 48 hours to completely remove the residual solvents to form AlPO-14/poly(BTDA-APAF-HAB) mixed matrix membrane.

EXAMPLE 10

Preparation of AlPO-14/PBO(BTDA-APAF-HAB) Mixed Matrix Membrane

The AlPO-14/poly(BTDA-APAF-HAB) mixed matrix membrane prepared in Example 9 was thermally heated from 50° to 400° C. at a heating rate of 5° C./min under $N_2$ flow. The membrane was held for 1 hour at 400° C. and then cooled down to 50° C. at a heating rate of 5° C./min under $N_2$ flow to yield AlPO-14/PBO(BTDA-APAF-HAB) mixed matrix membrane.

EXAMPLE 11

Preparation of "Control" poly(BTDA-APAF-HAB)polyimide Membrane

A "control" poly(BTDA-APAF-HAB)polyimide membrane was prepared as follows: 4.5 g of poly(BTDA-APAF-HAB)polyimide synthesized in Example 8 was dissolved in a solvent mixture of 12.0 g of NMP and 12.0 g of 1,3-dioxolane. The mixture was mechanically stirred for 2 hours to form a homogeneous casting dope. The resulting homogeneous casting dope was allowed to degas overnight. The poly(BTDA-APAF-HAB)polymer membrane was prepared from the bubble free casting dope on a clean glass plate using a doctor knife with a 20-mil gap. The membrane together with the glass plate was then put into a vacuum oven. The solvents were removed by slowly increasing the vacuum and the temperature of the vacuum oven. Finally, the membrane was dried at 200° C. under vacuum for at least 48 hours to completely remove the residual solvents to form poly(BTDA-APAF-HAB)polyimide membrane.

EXAMPLE 12

Preparation of PBO(BTDA-APAF-HAB) Membrane by Heat Treatment

A poly(BTDA-APAF-HAB) membrane was thermally heated from 50° C. to 400° C. at a heating rate of 5° C./min under $N_2$ flow. The membrane was held for 1 hour at 400° C. and then cooled down to 50° C. at a heating rate of 5° C./min under $N_2$ flow to yield PBO(BTDA-APAF-HAB) membrane.

EXAMPLE 13

$CO_2/CH_4$ Separation Performance of PBO(BTDA-APAF-HAB) and AlPO-14/PBO(BTDA-APAF-HAB) Membranes The PBO(BTDA-APAF-HAB)polymer membrane and AlPO-14/PBO(BTDA-APAF-HAB) mixed matrix membranes were tested for $CO_2/CH_4$ separation under a testing temperatures of 50° C. (Table 3). It can be seen from Table 3 that the AlPO-14/PBO(BTDA-APAF-HAB) mixed matrix membrane showed significantly increased $CO_2/CH_4$ selectivity ($\alpha_{CO2/CH4}$=70) and $CO_2$ permeability ($\alpha_{CO2}$=58 Barrer) compared to the neat PBO(BTDA-APAF-HAB) membrane.

TABLE 3

Pure gas permeation test results of PBO(BTDA-APAF-HAB) AlPO-14/PBO(BTDA-APAF-HAB) membranes for $CO_2/CH_4$ Separation[a]

| Membrane | $P_{CO2}$ (Barrer) | $\alpha_{CO2/CH4}$ |
|---|---|---|
| PBO(BTDA-APAF-HAB) | 24.9 | 47.3 |
| AlPO-14/PBO(BTDA-APAF-HAB) | 58.1 | 70.3 |

[a]$P_{CO2}$ and $P_{CH4}$ were tested at 50° C. and 690 kPa (100 psig);
1 Barrer = $10^{-10}$ cm$^3$ (STP) · cm/cm$^2$ · sec · cmHg.

EXAMPLE 14

$H_2/CH_4$ Separation Performance of PBO(BTDA-APAF-HAB) and AlPO-14/PBO(BTDA-APAF-HAB) Membranes The PBO(BTDA-APAF-HAB)polymer membrane and AlPO-14/PBO(BTDA-APAF-HAB) mixed matrix membranes were tested for $H_2/CH_4$ separation under testing a temperature of 50° C. (Table 4). It can be seen from Table 4 that the AlPO-14/PBO(BTDA-APAF-HAB) mixed matrix membrane showed significantly increased $H_2/CH_4$ selectivity ($\alpha_{H2/CH4}$=211) and $H_2$ permeability ($P_{H2}$=174 Barrer) compared to the neat PBO(BTDA-APAF-HAB) membrane.

TABLE 4

Pure gas permeation test results of PBO(BTDA-APAF-HAB) and AlPO-14/PBO(BTDA-APAF-HAB) membranes for $H_2/CH_4$ Separation[a]

| Membrane | $P_{H2}$ (Barrer) | $\alpha_{H2/CH4}$ |
|---|---|---|
| PBO(6FDA-HAB) | 84.2 | 159.8 |
| AlPO-14/PBO(6FDA-HAB) | 174.3 | 211.0 |

[a]$P_{H2}$ and $P_{CH4}$ were tested at 50° C. and 690 kPa (100 psig);
1 Barrer = $10^{-10}$ cm$^3$ (STP) · cm/cm$^2$ · sec · cmHg.

The invention claimed is:
1. A process for separating at least one gas or liquid from a mixture of gases or liquids comprising providing a polybenzoxazole-based mixed matrix membrane that is permeable to at least one of said gases or liquids wherein said polybenzoxazole-based mixed matrix membrane is prepared by first fabricating a polyimide-based mixed matrix membrane by dispersing molecular sieve particles such as AlPO-14 molecular sieve particles in a continuous aromatic polyimide matrix with pendent hydroxyl groups ortho to the heterocyclic imide nitrogen; and then converting the polyimide-based mixed matrix membrane to a polybenzoxazole-based mixed matrix membrane by applying heat between 300° and 600° C. under inert atmosphere or vacuum; contacting the mixture of gases or liquids to one side of the polybenzoxazole-based mixed matrix membrane to cause said at least one of said gases or liquids to permeate the polybenzoxazole-based mixed matrix membrane and removing from an opposite side of the polybenzoxazole-based mixed matrix membrane a permeate gas or liquid composition comprising a portion of the at least one gas or liquid that permeated the membrane.

2. The process of claim 1 wherein said gas or liquid comprises at least one volatile organic compound in an atmospheric gas.

3. The process of claim 1 wherein said gases or liquids comprise a mixture of hydrogen, nitrogen, methane and argon in an ammonia purge stream.

4. The process of claim 1 wherein said gases or liquids comprise hydrogen from a hydrocarbon vapor stream.

5. The process of claim 1 wherein said gases or liquids comprise a mixture of at least one pair of gases selected from the group consisting of nitrogen and oxygen, carbon dioxide and methane, and hydrogen and methane or a mixture of carbon monoxide, helium and methane.

6. The process of claim 1 wherein said gases or liquids comprise natural gas comprising methane and at least one gas component selected from the group consisting of carbon dioxide, oxygen, nitrogen, water vapor, hydrogen sulfide, helium and other trace gases.

7. The process of claim 1 wherein said gases or liquids comprise hydrocarbon gases, carbon dioxide, hydrogen sulfide and mixtures thereof.

8. The process of claim 1 wherein said gases or liquids comprise mixtures of olefins and paraffins.

9. The process of claim 1 wherein said gases or liquids comprises mixtures of iso paraffins and normal paraffins.

10. The process of claim 1 wherein said polybenzoxazole-based mixed matrix membrane further comprises a species selected from the group consisting of cobalt porphyrins, phthalocyanines and silver (I).

11. A process of separating liquid mixtures by pervaporation wherein said process comprises contacting a polybenzoxazole-based mixed matrix membrane liquids with a liquid mixture comprising at least one organic compound wherein said polybenzoxazole-based mixed matrix membrane is prepared by first fabricating a polyimide-based mixed matrix membrane by dispersing molecular sieve particles such as AlPO-14 molecular sieve particles in a continuous aromatic polyimide matrix with pendent hydroxyl groups ortho to the heterocyclic imide nitrogen; and then converting the polyimide-based mixed matrix membrane to a polybenzoxazole-based mixed matrix membrane by applying heat between 300° and 600° C. under inert atmosphere or vacuum.

12. The process of claim 11 wherein said organic compound is selected from the group consisting of alcohols, phenols, chlorinated hydrocarbons, pyridines and ketones.

13. The process of claim 11 wherein said liquid mixture comprises a mixture of sulfur compounds with gasoline or diesel fuels.

14. The process of claim 11 wherein said liquid mixture comprises a mixture selected from the group consisting of ethylacetate-ethanol, diethylether-ethanol, acetic acid-ethanol, benzene-ethanol, chloroform-ethanol, chloroform-methanol, acetone-isopropylether, allylalcohol-allylether, allylalcohol-cyclohexane, butanol-butylacetate, butanol-1-butylether, ethanol-ethylbutylether, propylacetate-propanol, isopropylether-isopropanol, methanol-ethanol-isopropanol, and ethylacetate-ethanol-acetic acid.

* * * * *